April 28, 1936.   R. G. LEMMERMAN   2,039,172
MOISTUREPROOFED MOLDED ARTICLE AND PROCESS OF MAKING THE SAME
Filed Feb. 27, 1934
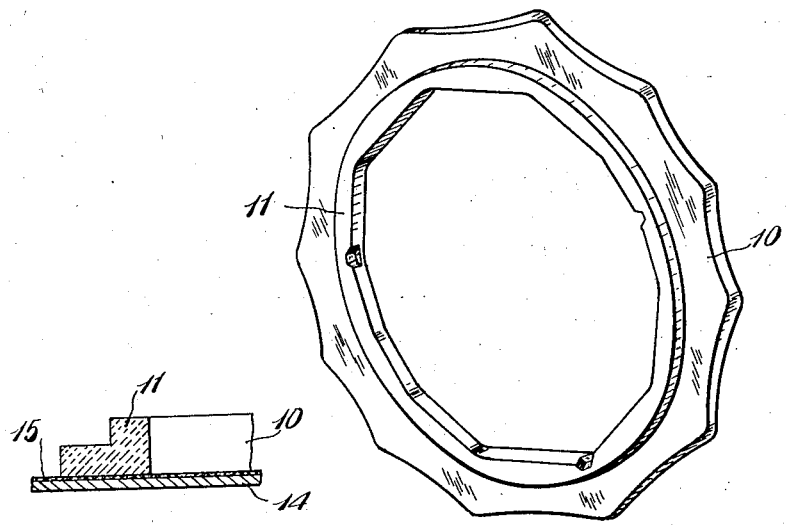
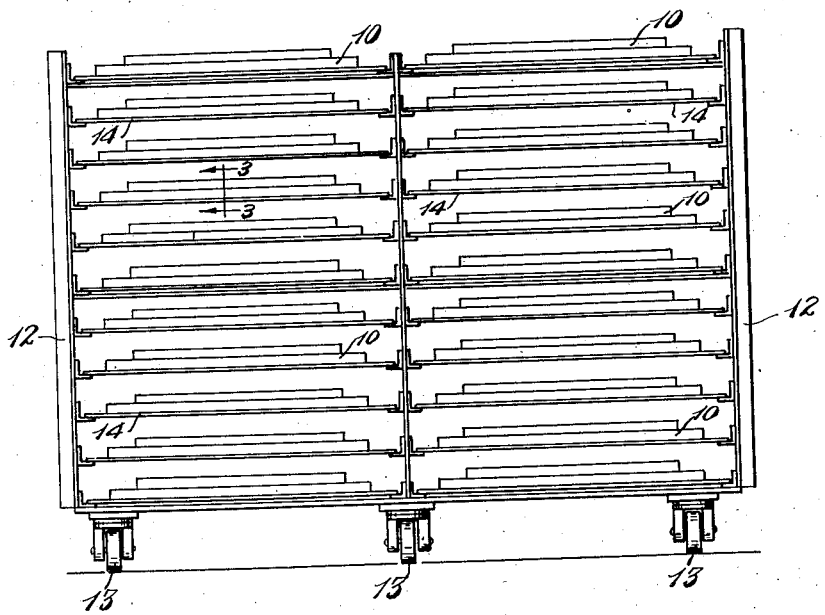
INVENTOR:
ROBERT G. LEMMERMAN
Kwis Hudson & Kent
ATTORNEYS Patented Apr. 28, 1936

2,039,172

UNITED STATES PATENT OFFICE 2,039,172

MOISTUREPROOFED MOLDED ARTICLE AND PROCESS OF MAKING THE SAME

Robert G. Lemmerman, Lakeline, Ohio, assignor to The Ferro Engineering Company, Cleveland, Ohio, a corporation of Ohio Application February 27, 1934, Serial No. 713,151

10 Claims. (Cl. 25—156)

This invention relates to moisture-proofed molded articles, and applies to all molded articles wherein a binder of water-glass is employed. The invention also has to do with the method of producing such moisture-proofed articles.

When a molded article, artificial stone for example, is produced by mixing an aggregate with water-glass, molding the mixture to the desired form, and baking it to drive off the greater part of the water in the binder, the article is at first quite dry and will not crumble or wear off readily at the surface. However, after standing in the atmosphere for a considerable time the soluble silicate reabsorbs moisture, particularly at and near the outer surfaces, thereby losing a considerable part of its binding effect, and the hardness and strength of the article are correspondingly reduced.

The principal object of the present invention is the moisture-proofing of such articles so that the original hardness and strength are retained indefinitely.

Another object is the production of a molded article which may be subjected to sudden temperature changes over a wide range without cracking or breaking.

Another object of the invention is the provision of a method or process of making a molded article comprising water-glass as one of its constituents, in accordance with which some or all of a soluble silicate binder is converted into an insoluble material, probably an insoluble silicate, whereby the article is rendered moisture-proof.

Another object is the provision of a method for the purpose specified in which a chemical change in the binder producing an insoluble compound of silicon takes place. The action is not fully completed until the article is dried by baking. This delay in the chemical action pending the application of heat permits the addition of the water-proofing material to the original mix and avoids any extra steps in the process of making the article.

A further object is the provision of a method of making molded articles with water-glass binder, in which the articles are placed upon metallic supporting plates and baked, which consists in providing between the article and the plate a film of a chemical compound which will convert the soluble silicate at that surface into an insoluble compound of silicon, whereby adhesion of the molded article to the plate, formely caused by the sticky soluble silicate, is eliminated and relative expansion and contraction of the plate and article may take place, thereby preventing stresses in the molded article such as are set up in the prior practice by the more rapid expansion and contraction of the plate when the article is being baked and cooled.

Other objects and features of novelty will appear as I proceed with the description of the invention. In the accompanying drawing, Fig. 1 is a perspective view of a ring constituting a lining element for a hot top, which is one example of the numerous molded articles in which the present invention may be advantageously incorporated or in the making of which the present invention may be used.

Fig. 2 is an elevational view of a wheeled rack carrying molded articles to be baked, and Fig. 3 is a cross sectional view taken substantially on the line 3—3 of Fig. 2, and showing a molded article and its supporting plate on an enlarged scale.

In the drawing I have shown the application of the invention to bottom rings for hot tops employed upon ingot molds, that is to say lining rings for the protection of the lower ends of the hot top casings. These rings are of course subjected to the action of molten steel, and it is important that they should be able to withstand the high heat of the metal without spalling or breaking, because the dropping of refractory material into the metal might ruin a costly ingot. The ring herein illustrated constitutes one element of a lining for a hot top casing, being intended to be used as a substitute for a lower lining course formerly constructed of a plurality of refractory blocks, such for instance as those illustrated in Patent 1,804,206 to Charman et al., dated May 5, 1931.

In Fig. 1, 10 is a homogeneous one-piece refractory ring having a perimeter formed with a contour corresponding with the inner contour of the ingot mold with which the hot top is to be used. Along its inner edge the ring is formed with an upstanding rim 11, which is adapted to protect the inner edge of the casing ledge, by means of which the upper lining elements of the hot top are supported. The rim 11 also affords a means for centering the ring on the hot top. Any suitable means may be employed for attaching it to the casing.

The ingredients which I employ in making up molded articles according to my invention include a suitable aggregate preferably silica sand of a relatively fine grade, washed to remove any impurities. Other materials may be used however, including mineral matter of various kinds in a more or less finely divided state, as for instance ores, gravel and furnace slag. Various non-metallic materials may also be employed. Paper pulp and finely divided cork may be mentioned as examples.

The aggregate is mixed thoroughly with a small quantity of a soluble sulphate, preferably a sulphate of one of the following group of metals characterized by their ability to react with water-glass, soluble silicate. Ferrous sulphate, known commercially as sugar copperas, is particularly well suited to the purpose. Other sulphates which may be substituted with more or less success are ferric sulphate and sulphates of the following metals, zinc, copper, lead and aluminum. These materials are given by way of example only.

The quantity of the sulphate to be used is very small comparatively, and bears a direct relation to the quantity of silicate. Since the quantity of silicate in the molded article may vary between fairly large limits, it is difficult to prescribe limits for the sulphate. It is important however to note that the quantity of sulphate for any given silicate content must not pass a certain critical point, which is in the neighborhood of 5% or 6% by weight of the soluble silicate solution. This proportion is based upon the use of sodium silicate water-glass having a water content of 60% to 65%. Below such critical point the water-proofing effect of the sulphate increases as the quantity increases. A material excess of sulphate above the critical point has a deleterious effect upon the binding qualities of the silicate.

I prefer to dissolve the desired amount of sulphate in water, the quantity of which may be varied considerably. Merely by way of example, I may state that in a 1000 lb. mix, if the quantity of ferrous sulphate used should amount to 6 lbs., the water used might be 3 or 4 gallons, that is 25 lbs., roughly.

The order in which the various ingredients are added to the mix seems to have little importance so long as they are thoroughly and intimately commingled. For reasons of convenience I prefer to mix the aggregate with the sulphate solution, and afterward to add the water-glass and again thoroughly mix the mass. The quantity of water-glass may vary between the limits of about 6% to 20% by weight of the entire mass, approximately 12% being preferred, however.

In a 1000 lb. batch, therefore, the weights of the different ingredients may be said, by way of example merely, to be as follows:

849 pounds aggregate, or 84.9%
120 pounds water-glass, or 12%
25 pounds water, or 2½%
6 pounds ferrous sulphate, or .6%.

When the mixture of materials as above specified is completed, the articles to be formed are molded and compacted, after which they are dried in a temperature above 212° F. This drying or baking step is carried out preferably in an atmosphere substantially free from carbon monoxide and carbon dioxide in order to avoid the breaking up of the sodium silicate to form a carbonate which has no binding effect. The drying is carried far enough to expel nearly all of the moisture in the mixture, present either as free water or as a part of the sodium silicate solution. The temperature of the drying oven will vary with the length of time the molded article will remain in the oven. It should be high enough to drive off the moisture, but not high enough to vitrify the material and destroy the binding qualities of the silicate.

While I am not entirely certain of the chemical reactions which take place in the course of the production of molded articles embodying the invention, to the best of my knowledge and belief the soluble sulphate reacts chemically with the sodium silicate before the baking of the article, and in fact immediately upon these ingredients coming together, to form an insoluble, soft, moldable precipitate $FeSi_4O_9$. Thereafter, when heat is applied, that is when the articles are baked the $FeSi_4O_9$ is broken up into one or both of the following compounds: $FeO \cdot SiO_2$ and $FeO \cdot 2SiO_2$. The probable reactions may be written as follows:

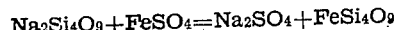
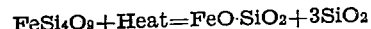
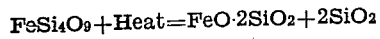

$$Na_2Si_4O_9 + FeSO_4 = Na_2SO_4 + FeSi_4O_9$$
$$FeSi_4O_9 + Heat = FeO \cdot SiO_2 + 3SiO_2$$
$$FeSi_4O_9 + Heat = FeO \cdot 2SiO_2 + 2SiO_2$$

The ferrous compounds remaining after the article is baked are insoluble. They appear to be present in sufficient quantity to water-proof the article, but they do not replace all of the sodium silicate. If, in a 12% water-glass mix as heretofore described, the sulphate were to be added in excess of approximately .6% of the sodium silicate solution, that is to say .7% or .8% by weight of the whole mass, the resulting article would lose strength and rigidity, and if the proportion of sulphate were to be increased still further, say to 1½% of the whole mass, the binder would be substantially destroyed except at and near the surface of the article.

In Figs. 2 and 3 of the drawing I have illustrated an apparatus which may be employed in the baking of the molded articles. 12 is a rack made up of angle iron bars or the like and provided with wheels 13 by means of which the rack may be moved readily into and out of a baking oven, not shown. The molded articles are placed upon flat plates 14 of sheet iron, and the plates are positioned upon the various shelves of the rack. Considerable difficulty has been experienced heretofore in preventing small cracks in the rings in or adjacent to the surface which contacts with the plates, and this difficulty is due apparently to the difference in the rate of expansion and contraction between the plate and the molded article, and to the fact that the sodium silicate binder is of a sticky nature, which causes the ring to adhere to the plate. When the rack with its plates and rings is placed in the baking oven the plates 14 tend to expand to a greater extent than the rings, but the adhesion between the rings and the plates causes the rings to be stretched at the surfaces adjacent the plates. This stretching subjects the rings to internal strains which produce the cracks when the cooling of the rings and plates takes place.

I have discovered that the surface of the ring which contacts with the plates may be treated with certain chemicals to cause an instantaneous conversion of the sodium silicate at the surface into an insoluble silicate which will not adhere to the plate, and will thus permit the plate to expand independently of the ring and thereby avoid putting strains into the ring. For this purpose I prefer to spray the plate with a soluble chloride other than sodium chloride. The best material for this purpose that I have discovered is calcium chloride, but iron chloride, aluminum chloride and ammonium chloride are also satisfactory. In Fig. 3 I have illustrated on an exaggerated scale a coating 15 of this character applied to the upper surface of the metal plate 14.

Having thus described my invention, I claim:

1. A method of making a molded article, which comprises intimately commingling with an aggregate and with sodium silicate a quantity of soluble sulphate of one of the group comprising iron, zinc, copper and aluminum not exceeding 6% by weight of the silicate, molding the mass into the form of the desired article, and baking it.

2. A method of making a molded article, which comprises intimately commingling the following ingredients in substantially the following proportions by weight: an aggregate approximately 80% to 94%, water-glass 6% to 20%, iron sulphate not in excess of .7%, molding the mass into the form of the desired article, and baking it until the greater part of the moisture in the water-glass is expelled.

3. A method of making a molded article, which comprises intimately commingling with an aggregate of finely divided inorganic matter a quantity of iron sulphate, and a quantity of water-glass, molding the mass into the form of the desired article, and baking it, the proportions of said ingredients by weight being approximately 87% aggregate, 12% water-glass and .6% iron sulphate.

4. A method of making a molded article, which comprises intimately commingling with an aggregate a quantity of water-glass sufficient to constitute a good binder for the mass and a quantity of iron sulphate equal to approximately 5% by weight of the water-glass, molding the mass to the form of the desired article, and baking it.

5. A method of making a molded article which comprises intimately commingling with silica sand a quantity of water-glass sufficient to constitute a good binder for the mass and a quantity of iron sulphate equal to approximately 5% by weight of the water-glass, molding the mass to the form of the desired article, and baking it.

6. A method of making a molded article containing water-glass as a binder, which comprises thoroughly mixing water-glass with an aggregate, molding the mass to the form of the desired article, placing the molded mass upon a metal plate with a film of soluble chloride other than sodium chloride between the molded mass and the plate, placing the plate with the molded mass in an oven, and baking it.

7. A method of making a molded article containing water-glass as a binder, which comprises thoroughly mixing water-glass with an aggregate, molding the mass to the form of the desired article, coating a metallic plate with a soluble chloride other than sodium chloride, placing the molded mass upon the coated plate, and subjecting the plate and molded mass to a baking temperature.

8. A method of making a molded article containing water-glass as a binder, which comprises thoroughly mixing water-glass with an aggregate, molding the mass to the form of the desired article, placing the molded mass upon a metal plate, with a film of calcium chloride between the molded mass and the plate, and subjecting the plate and molded mass to a baking temperature.

9. A method of making a molded article, which comprises intimately commingling an aggregate, a metallic sulphate and a soluble silicate, the sulphate being present in a quantity less than .7% of the whole, coating a metal plate with a soluble chloride other than sodium chloride, placing the molded mass upon the coated plate, introducing the plate with the molded mass thereon into a baking oven, and applying heat to drive off the greater part of the moisture in the soluble silicate.

10. A baked refractory comprising an aggregate and an alkaline silicate binder, said refractory including a moisture-proofing ingredient comprising a sulphate of one of the group of metals consisting of iron, zinc, copper and aluminum present in the original mix in a proportion of less than 6% by weight of the alkaline silicate solution.

ROBERT G. LEMMERMAN.